United States Patent
Liu et al.

(10) Patent No.: US 11,831,187 B2
(45) Date of Patent: Nov. 28, 2023

(54) SERIES BATTERY PACK CAPACITY ON-LINE MONITORING AND CHARGING/DISCHARGING DUAL-STATE EQUALIZATION CIRCUIT AND METHOD

(71) Applicant: SHANDONG UNIVERSITY, Shandong (CN)

(72) Inventors: Xiaojun Liu, Shandong (CN); Yilin Liu, Shandong (CN)

(73) Assignee: SHANDONG UNIVERSITY, Shandong (CN)

( * ) Notice: Subject to any disclaimer, the term of this patent is extended or adjusted under 35 U.S.C. 154(b) by 414 days.

(21) Appl. No.: 17/298,952

(22) PCT Filed: Oct. 12, 2020

(86) PCT No.: PCT/CN2020/120466
§ 371 (c)(1),
(2) Date: Jun. 2, 2021

(87) PCT Pub. No.: WO2021/068972
PCT Pub. Date: Apr. 15, 2021

(65) Prior Publication Data
US 2022/0060031 A1 Feb. 24, 2022

(30) Foreign Application Priority Data
Oct. 12, 2019 (CN) .......................... 201910969033.X

(51) Int. Cl.
*H02J 7/00* (2006.01)
(52) U.S. Cl.
CPC .......... *H02J 7/0019* (2013.01); *H02J 7/0048* (2020.01); *H02J 7/007182* (2020.01)
(58) Field of Classification Search
CPC .. H02J 7/0019; H02J 7/0048; H02J 7/007182; H02J 7/0068; Y02E 60/10;
(Continued)

(56) References Cited

U.S. PATENT DOCUMENTS 8,896,315 B1 * 11/2014 Davies ................... H02J 7/0016
320/120

FOREIGN PATENT DOCUMENTS

| CN | 101917047 | 12/2010 |
| CN | 102664433 | 9/2012 |

(Continued)

OTHER PUBLICATIONS

Z. Nie and C. Mi, "Fast battery equalization with isolated bidirectional DC-DC converter for PHEV applications," 2009 IEEE Vehicle Power and Propulsion Conference, Dearborn, MI, USA, 2009, pp. 78-81, doi: 10.1109/VPPC.2009.5289866. (Year: 2009).*

(Continued)

*Primary Examiner* — M Baye Diao
(74) *Attorney, Agent, or Firm* — JCIP GLOBAL INC.

(57) ABSTRACT

The present disclosure provides a series battery pack capacity on-line monitoring and charging/discharging dual-state equalization circuit and method. The series battery pack capacity on-line monitoring and charging/discharging dual-state equalization circuit includes a storage battery pack, a gating switch array, a power dissipation loop, a polarity matching switch array, an isolated DC/DC converter, a bipolar differential battery voltage measurement circuit, a micro controller unit, a charging/discharging current detection loop, and a switch circuit unit. According to the present disclosure, each series battery of the storage battery pack can be separately charged and discharged by controlling the gating switch array, the storage battery pack capacity can be detected on line, bypass discharge and parallel supplement can be carried out on the series batteries with high or low relative state of charge in two states of charging and discharging, and the power of each series battery can be efficiently equalized.

20 Claims, 2 Drawing Sheets

(58) Field of Classification Search
CPC ......... Y02T 10/70; Y02T 10/92; Y02T 10/72; B60L 58/22
USPC ........................................................ 320/116
See application file for complete search history.

(56) References Cited

FOREIGN PATENT DOCUMENTS

| | | | | |
|---|---|---|---|---|
| CN | 101917047 B | * | 2/2014 | ................ H02J 7/00 |
| CN | 105896656 | | 8/2016 | |
| CN | 110752635 | | 2/2020 | |
| JP | 2001178008 | | 6/2001 | |

OTHER PUBLICATIONS

N. Sakr, D. Sadarnac and A. Gascher, "A new combined bidirectional boost converter and battery charger for electric vehicles," IECON 2015—41st Annual Conference of the IEEE Industrial Electronics Society, Yokohama, Japan, 2015, p. 001258-001263, doi: 10.1109/IECON.2015.7392273. (Year: 2015).*

"International Search Report (Form PCT/ISA/210) of PCT/CN2020/120466," dated Jan. 8, 2021, with English translation thereof, pp. 1-4.

"Written Opinion of the International Searching Authority (Form PCT/ISA/237) of PCT/CN2020/120466," dated Jan. 8, 2021, with English translation thereof, pp. 1-9.

* cited by examiner

SERIES BATTERY PACK CAPACITY ON-LINE MONITORING AND CHARGING/DISCHARGING DUAL-STATE EQUALIZATION CIRCUIT AND METHOD

CROSS-REFERENCE TO RELATED APPLICATION

This application is a 371 of international application of PCT application Ser. No. PCT/CN2020/120466, filed on Oct. 12, 2020, which claims the priority benefits of China Patent Application No. 201910969033.X, filed on Oct. 12, 2019. The entirety of each of the above mentioned patent applications is hereby incorporated by reference herein and made a part of this specification.

BACKGROUND

Technical Field

The present disclosure relates to the technical field of storage batteries, and more particularly, to a series battery pack capacity on-line monitoring and charging/discharging dual-state equalization circuit and method.

Description of Related Art

The description in this section merely provides background information related to the present disclosure, and does not necessarily constitute the prior art.

With the continuous deterioration of the earth environment, reducing all kinds of harmful emissions has become a major problem facing by all mankind. As the most convenient electric energy storage device, various high-capacity storage battery packs are widely used in standby power supply devices for various applications such as safety monitoring and communication facilities, as well as new energy transportation tools such as electric automobiles, electric ships and unmanned aerial vehicles. In order to meet the requirements of an application system on battery capacity and voltage, a plurality of storage battery cells need to be connected in parallel and in series into a battery pack. After the battery cells are connected in series, in order to guarantee the service life and the operation safety of the storage battery pack, the storage battery pack is usually provided with a set of protection circuits for measuring and monitoring the voltage of each series battery and cutting off a charging/discharging circuit, so that each series battery in the storage battery pack cannot be charged with too high voltage and discharged with too low voltage. Because of the defects of a manufacturing process and the difference of the use environment caused by installation positions, the leakage current of each series battery is different, and a relative state of charge (SOC) of the series batteries will be unequalized from month to month. When the voltages of the series batteries in the storage battery pack are different, a series battery with high voltage during charging is firstly charged to an over-voltage protection value to generate charging protection, and a series battery with low voltage during discharging is firstly put to an under-voltage protection value to generate discharging protection, so that an effective available capacity (i.e. state of health SOH) of the storage battery pack is reduced, and the energy storage efficiency and the service life of the storage battery pack are influenced.

In order to maintain the effective capacity of the storage battery pack, an equalization circuit is usually adopted to force the voltage of each series battery in the storage battery pack to reach an equal equalization state after charging. The working mode of the equalization circuit is divided into an energy dissipation type and an energy transfer type. The energy dissipation type equalization circuit is that a bypass resistor with a controllable switch is connected in parallel to two ends of each series batteries, and when the voltage of any series battery is higher than a certain threshold, the bypass resistor is switched on to shunt current charged into the series battery to achieve equalization. The mode is simple in circuit and low in cost, is widely applied to small miniature storage battery packs, and has the defects that energy consumed by an equalization resistor is converted into heat, and a large-volume space is needed for dissipating the heat, so that the equalization capability is limited, and the equalization requirements of a large-capacity storage battery pack cannot be met. The energy transfer type equalization circuit is that energy of a series battery with higher voltage is transferred to other series batteries or a main loop through a reactive element (inductor or capacitor) or a DC/DC converter, and the charging current of the series battery is reduced to achieve equalization; or the energy of the main loop or other series batteries is transferred to a series battery with lower voltage through the reactive element (inductor or capacitor) or the DC/DC converter, and the charging current of the series battery is increased to achieve equalization. The mode is small in heat generation amount, may be used for equalizing the large-capacity storage battery pack, and has the defects of complex circuit and high cost.

For a storage battery pack of a standby power supply, storage battery packs of many application systems (such as a safety monitoring system) are in a long-time idle standby state, and storage batteries may be started to supply power only in occasional situations. The storage battery in a long-time idle state has the problems that the relative state of charge (SOC) of each series battery is unequalized and the capacity of some batteries is reduced due to manufacturing defects or environmental influences, so that the effective capacity (i.e. state of health SOH) of the storage battery pack is greatly reduced or even completely failed. When the storage battery pack is used for power supply, power support cannot be effectively provided, resulting in failure of the entire system with serious consequences. In order to ensure the effectiveness of the storage battery pack, the capacity test of an important system usually needs to be carried out on an application site at regular intervals, equipment must be moved back to a laboratory for testing on some occasions (such as an explosive environment), the maintenance work is time-consuming, labor-consuming and high in cost, and if power supply requirements burst in the test and maintenance process, standby power supply cannot be provided, so that the system fails.

A discharge experiment method is adopted to reliably and accurately determine the state of health (SOH) of the storage battery pack: the battery pack is discharged from a large relative state of charge ($SOC_0$) to a small relative state of charge ($SOC_1$), a difference value of the relative state of charge ($SOC_D$) is calculated, the discharging current is subjected to time integration to obtain a discharged actual power ($ROC_D$), and an actual capacity of the battery pack is calculated to be $ROC_D/SOC_D$. The capacity value determined by this method is accurate and reliable, but a deep discharge experiment needs to be carried out on the battery pack, special discharge circuit and measurement device are needed, standby supply of power needs to be interrupted during measurement, and on-line measurement cannot be realized. On-line testing of the state of health (SOH) of the storage battery pack usually uses a battery internal resistance method. By injecting alternating current signals with certain frequency into both ends of the storage battery pack, the amplitude and phase difference of voltage and current at the both ends of the storage battery pack are tested, and the internal resistance of the storage battery pack is calculated, so as to judge the effective capacity of the storage battery pack (i.e. state of health SOH). This method has the disadvantages that the measurement accuracy is poor, the method is easy to be influenced by environment and other factors, the estimated result error is great, and the reliability of an application system cannot be ensured.

SUMMARY

In order to solve the defects of the prior art, the present disclosure provides a series battery pack capacity on-line monitoring and charging/discharging dual-state equalization circuit and method, which can realize on-line detection of an effective capacity of a storage battery pack and power equalization of series batteries in two states of charging and discharging.

To achieve the foregoing objective, the present disclosure uses the following technical solutions:

A first aspect of the present disclosure provides a series battery pack capacity on-line monitoring and charging/discharging state equalization circuit.

A series battery pack capacity on-line monitoring and charging/discharging dual-state equalization circuit includes a storage battery pack, a gating switch array, a power dissipation loop, a polarity matching switch array, an isolated DC/DC converter, a bipolar differential battery voltage measurement circuit, a micro controller unit, a charging/discharging current detection loop, and a switch circuit unit.

The storage battery pack includes a plurality of series batteries. The gating switch array gates and connects positive poles of the odd-numbered series batteries of the storage battery pack to an odd bus through an electric control switch respectively, and gates and connects positive poles of the even-numbered series batteries and a main negative pole to the odd bus and an even bus through the electric control switch respectively. The odd bus and the even bus are connected to two ends of the power dissipation loop, two output ends of the polarity matching switch array and two input ends of the bipolar differential battery voltage measurement circuit respectively.

The polarity matching switch array disconnects the odd bus and the even bus from outputs of the isolated DC/DC converter or converts the odd bus and the even bus to be with the same voltage polarity as the outputs of the isolated DC/DC converter and then connects the odd bus, the even bus and the outputs of the isolated DC/DC converter together, the bipolar differential battery voltage measurement circuit converts bipolar high common mode battery voltage differential signal conditioning on the odd bus and the even bus into a unipolar voltage suitable for input requirements of the micro controller unit and referring to a signal ground and sends the unipolar voltage into the micro controller unit, and the charging/discharging current detection loop and a switch circuit are connected in series to a main negative pole output connecting line of the storage battery pack.

As some possible implementations, the polarity matching switch array includes two groups of double-pole linkage electric control switches cross-connected in parallel, a normally-open switch of the first group of electric control switches is bridged between the odd bus and a positive pole of the isolated DC/DC converter, and another normally-open switch is bridged between the even bus and a negative pole of the isolated DC/DC converter.

A normally-open switch of the second group of electric control switches is bridged between the even bus and the positive pole of the isolated DC/DC converter, another normally-open switch is bridged between the odd bus and the negative pole of the isolated DC/DC converter, and the outputs of the isolated DC/DC converter are connected with the series batteries of the storage battery pack gated by the gating switch array with the same polarity by controlling the two electric control switches to be turned on in a time-sharing manner.

As a further limitation, the polarity matching switch array is a circuit unit with four ports formed by a plurality of groups of electric control switches, two of the ports are connected with the odd bus and the even bus, the other two ports are connected with positive output ends and negative output ends of the isolated DC/DC converter, and the on-off of an internal switch is controlled by the micro controller unit.

As some possible implementations, the gating switch array is composed of a number of series batteries and an electric control switch, the storage battery pack is formed by connecting a plurality of storage batteries in series, a main positive pole and a main negative pole of the storage battery pack and each battery series connection point are connected to one end of an electric control switch normally-open switch contact of the gating switch array, the other end of the electric control switch normally-open switch contact connected with the positive poles of the odd-numbered series batteries is connected to the odd bus, and the other end of the electric control switch normally-open switch contact connected with the positive poles of the even-numbered series batteries and the main negative pole of the storage battery pack is connected to the even bus.

As some possible implementations, the power dissipation loop is formed by connecting a normally-open switch contact of an electric control switch and a resistor or an equivalent electric energy dissipation circuit network in series.

As some possible implementations, input ends of the isolated DC/DC converter are connected to the main positive pole and the main negative pole of the storage battery pack, output ends are connected to an input end of the polarity matching switch array respectively, the inputs and the outputs are electrically isolated, an input voltage range is required to be larger than a variation range of a total output voltage of the storage battery pack, an output no-load voltage is equal to the maximum allowable operating voltage of the series batteries of the storage battery pack, a current limiting output characteristic is presented, and the maximum output current is not greater than the maximum allowable charging current of the series batteries of the storage battery pack.

As some possible implementations, two input ends of the bipolar differential battery voltage measurement circuit are connected to the odd bus and the even bus respectively, an output end is connected to the micro controller unit, input signals with positive polarity and negative polarity may be differentially amplified, and an input common-mode voltage range is not smaller than the highest output voltage of the storage battery pack.

As some possible implementations, the micro controller unit performs AD conversion acquisition on signals output from the bipolar differential battery voltage measurement circuit, and controls on-off of corresponding electric control switches in the gating switch array, the polarity matching switch array and the power dissipation loop according to a working state of the storage battery pack determined by parameters such as voltage and charging/discharging current of all the series batteries of the storage battery pack obtained through time-sharing measurement, so as to achieve on-line measurement and evaluation of an effective capacity of the storage battery pack and efficient equalized management of a state of charge of each series battery of the storage battery under two working states of charging and discharging.

A second aspect of the present disclosure provides a series battery pack capacity on-line monitoring and charging/discharging dual-state equalization system.

A series battery pack capacity on-line monitoring and charging/discharging dual-state equalization system includes at least one storage battery pack. The storage battery pack uses the series battery pack capacity on-line monitoring and charging/discharging dual-state equalization circuit of the present disclosure for measurement and evaluation of an effective capacity of the storage battery pack and efficient equalized management of a state of charge of each series battery of the storage battery pack under two working states of charging and discharging.

A third aspect of the present disclosure provides a series battery pack capacity on-line monitoring and charging/discharging dual-state equalization method.

A series battery pack capacity on-line monitoring and charging/discharging dual-state equalization method uses the series battery pack capacity on-line monitoring and charging/discharging dual-state equalization circuit of the present disclosure.

An efficient equalization working process under a charging state of a storage battery pack specifically includes:

under the charging state, connecting a positive pole end and a negative pole end of a series battery with the maximum voltage deviation from a central value to an odd bus and an even bus through a gating switch array; if the battery is greater than the central value, turning on a dissipation loop electric control switch of a power dissipation loop, and dissipating energy of the battery through a dissipation resistance load or shunting current charged into the battery, thereby reducing the voltage of the battery or the voltage rising speed; and if the battery voltage is smaller than the central value, connecting odd-numbered series batteries to a second polarity matching switch group of a polarity matching switch array and connecting even-numbered series batteries to a first polarity matching switch group of the polarity matching switch array, so that the gated series batteries are connected to an isolated DC/DC converter for power supplement in a polarity corresponding manner, thereby increasing the voltage of the battery or the voltage rising speed to achieve equalization working under the charging state.

An efficient equalization working process under a discharging state of the storage battery pack specifically includes:

under the discharging state, connecting a positive pole end and a negative pole end of a series battery with the minimum voltage value to the odd bus and the even bus through the gating switch array, connecting the odd-numbered series batteries to the second polarity matching switch group of the polarity matching switch array and connecting the even-numbered series batteries to the first polarity matching switch group of the polarity matching switch array, so that the gated series batteries are connected to the isolated DC/DC converter for power supplement assistance in a polarity corresponding manner, and the power consumption of the battery is reduced to achieve equalization working under the discharging state.

A storage battery pack capacity on-line detection process specifically includes:

setting an interval time of capacity monitoring according to system requirements, sequentially connecting a positive pole end and a negative pole end of a series battery of the storage battery pack to the odd bus and the even bus in a time-sharing manner through the gating switch array when the storage battery pack is connected with a charging power supply and is in a charging protection and non-discharging state, and turning on an electric control switch of the power dissipation loop to discharge the gated series battery through a resistor or an equivalent electric energy dissipation circuit network;

meanwhile, sending the voltage of the series battery to a micro controller unit through a bipolar differential battery voltage measurement circuit for real-time acquisition, calculating discharging current at each moment according to the acquired voltage of the series battery, load resistance or a resistance value of the equivalent electric energy dissipation circuit network, calculating an actual accumulated power $ROC_D$ discharged through time integration until the voltage of the battery drops to a set ratio according to a relative state of charge SOC corresponding to an open circuit voltage, turning off the electric control switch of the power dissipation loop to stop discharging, subtracting an initial relative state of charge $SOC_0$ corresponding to the open circuit voltage at the beginning of discharging from a relative state of charge $SOC_1$ corresponding to the open circuit voltage at the end of discharging to calculate a discharged relative state of charge $SOC_D$, and then calculating an $ROC_D/SOC_D$ value to be an actual capacity value of the series battery;

correspondingly connecting the series batteries to a group of switches of a polarity matching switch according to odd numbers and even numbers of the series batteries, so that the series batteries are connected to the isolated DC/DC converter in a polarity corresponding manner and are independently supplemented with power till a full-power state; and sequentially performing power discharge test on the capacity of each series battery of the storage battery pack according to this step and performing independent charging to restore the full-power state to always keep the battery pack to have high electric energy reserves, the minimum capacity of all the series batteries thus measured is the effective capacity of the storage battery pack.

As a further limitation, an emergency power supply process during storage battery pack capacity on-line detection specifically includes:

if the relative capacity of a battery pack being discharged and measured is low when the battery pack needs to supply power in a power discharge measurement process during on-line detection of the storage battery pack, correspondingly connecting the series batteries being discharged and measured to the polarity matching switch according to odd numbers and even numbers of the series batteries, so that the series batteries are connected to the isolated DC/DC converter in a polarity corresponding manner for power supplement assistance, thereby ensuring that the reduction of power which can be output by the whole battery pack is small.

Compared with the prior art, the present disclosure has the following beneficial effects:

1: Under an idle state of a battery pack, the actual capacity of each series battery may be accurately measured on line by moderately discharging the series batteries of the storage battery pack one by one, and the discharge-measured series batteries are separately charged through the isolated DC/DC converter to restore the state of charge, so that the on-line measurement of the effective capacity (i.e. state of health SOH) of the battery pack is achieved, and the emergency reliability reduction of the application system caused by the reduction of the effective capacity of the storage battery pack is avoided.

2: If the storage battery pack needs to be discharged when a certain series battery is subjected to discharge testing, the power of the whole battery pack may be used for power supplement assistance for the series battery being subjected to discharge testing through the isolated DC/DC converter, so that the effective output power loss of the whole storage battery pack is small, and uninterrupted power reserves are ensured for the application system.

3: Under a charging state, bypass shunting equalization of the charging current of the series batteries with high state of charge may be achieved through a dissipation resistance load of the power dissipation loop, and parallel increase equalization of the charging current of the series batteries with low state of charge may be achieved through the isolated DC/DC converter, so that the bidirectional equalization of the charging state is achieved, which has the advantages that: firstly, only series batteries deviating from a median voltage value need to be equalized, and the defect that the voltage of a plurality of series batteries needs to be equalized to the highest voltage or the lowest voltage in a unidirectional equalization mode (an equalization mode of only performing shunting or increasing on the series batteries) is avoided; and secondly, only one equalization member such as a power discharge loop or the isolated DC/DC converter with higher energy transfer efficiency works during equalization, so that the calorific value in the equalization process is low, a larger equalization current is allowed, the equalization efficiency is improved, the equalization time is shortened, the temperature rise inside the storage battery pack is reduced, and the temperature aging effect of the battery is reduced.

4: Under a discharging state, the isolated DC/DC converter is used for carrying out energy transfer supplement assistance on the series batteries with low state of charge, so that the power consumption speed is reduced, the equalization of the discharging state is realized, the time when the series batteries with low state of charge reach a discharge protection voltage threshold to cause the storage battery pack to be subjected to discharge protection is prolonged, so that power stored by each series battery is fully released, the effective capacity of the storage battery pack is effectively improved, and the service life is prolonged.

DESCRIPTION OF THE EMBODIMENTS

It should be noted that the following detailed descriptions are all exemplary and are intended to provide a further description of the present disclosure. Unless otherwise specified, all technical and scientific terms used herein have the same meaning as commonly understood by a person of ordinary skill in the technical field to which the present disclosure belongs.

It should be noted that terms used herein are only for describing specific implementations and are not intended to limit exemplary implementations according to the present disclosure. As used herein, the singular form is intended to include the plural form, unless the context clearly indicates otherwise. In addition, it should be further understood that terms "include" and/or "comprise" used in this specification indicate that there are features, steps, operations, devices, components, and/or combinations thereof.

Embodiment 1

Figure 1:
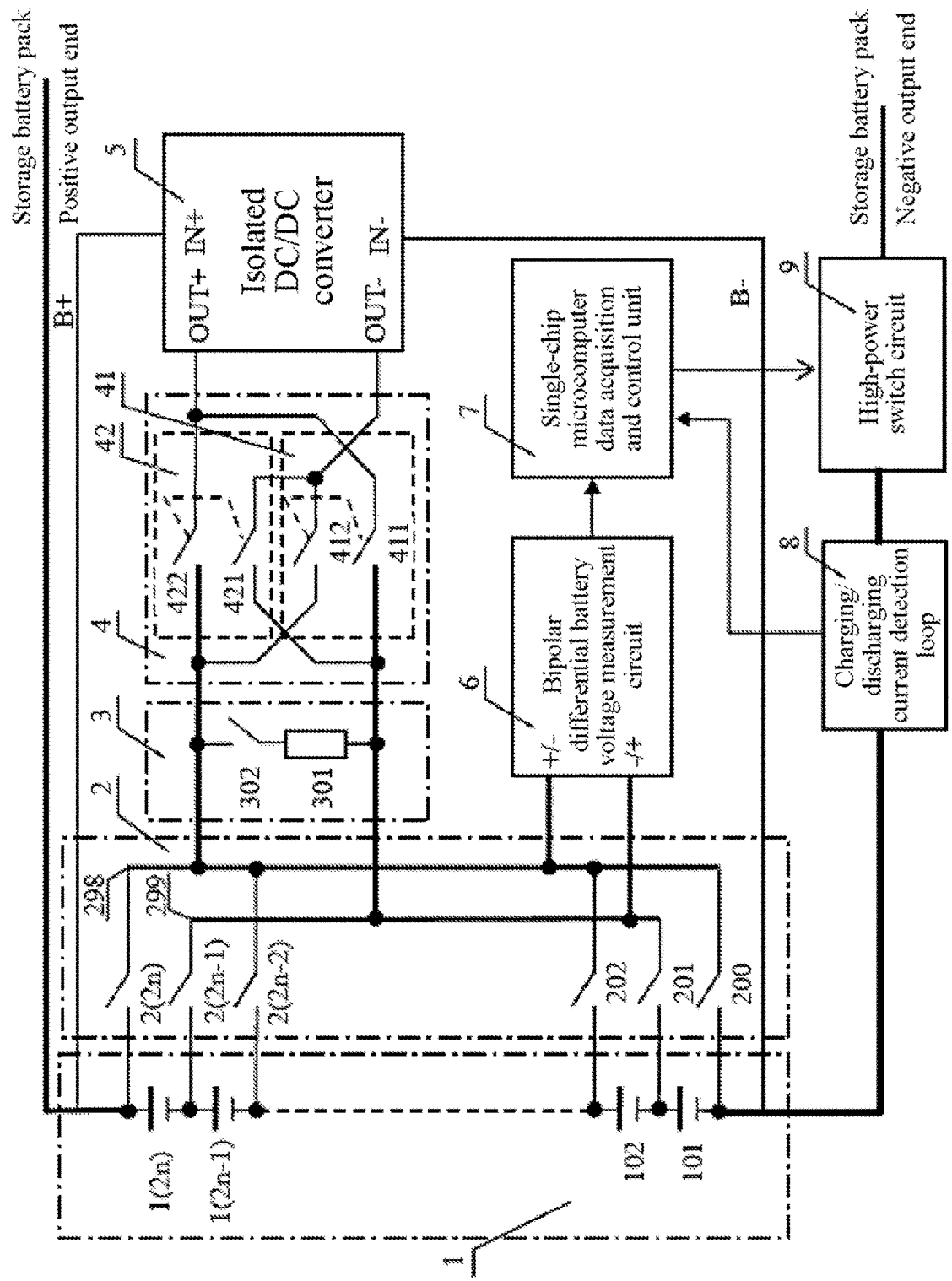
FIG. 1 is a schematic structural diagram of a battery pack circuit scheme having an even number of series batteries in Embodiment 1 of the present disclosure.
Figure 2:
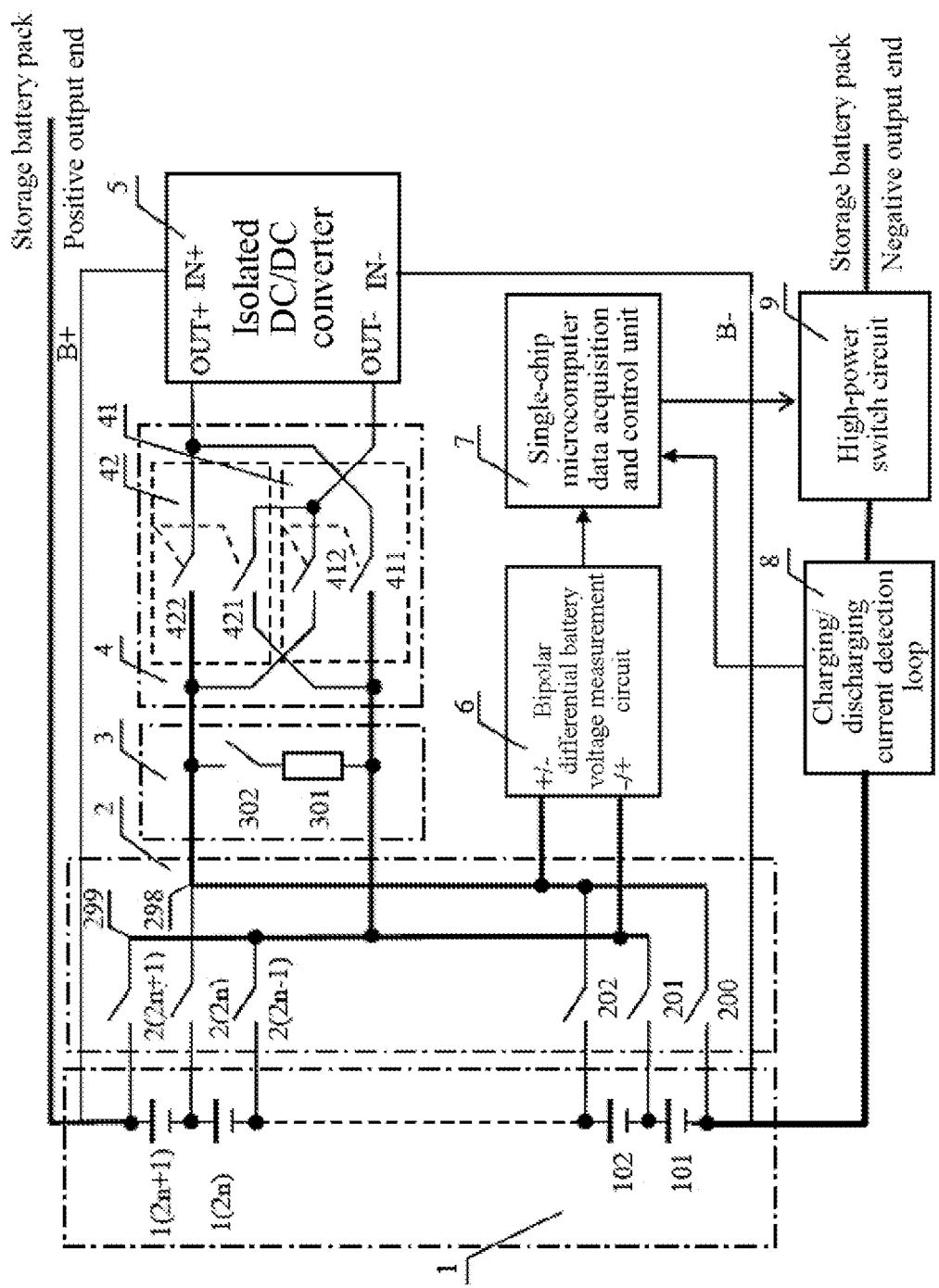
FIG. 2 is a schematic structural diagram of a battery pack circuit scheme having an odd number of series batteries in Embodiment 1 of the present disclosure.

As shown in FIG. 1 to FIG. 2, Embodiment 1 of the present disclosure provides a series battery pack capacity on-line monitoring and charging/discharging dual-state equalization circuit, which includes a storage battery pack 1, a gating switch array 2, a power dissipation loop 3, a polarity matching switch array 4, an isolated DC/DC converter 5, a bipolar differential battery voltage measurement circuit 6, a micro controller unit, a charging/discharging current detection loop 8, and a high-power switch circuit 9. The micro controller unit is a single-chip microcomputer data acquisition and control unit 7.

According to the present embodiment, any series battery of the storage battery pack is connected to a dissipation resistor for power consumption or is connected to the DC/DC converter for power supplement in a time-sharing manner by controlling the gating switch array, so that the on-line capacity detection of the storage battery pack and the power equalization of the series batteries in two states of charging and discharging may be achieved. The power of each series battery of the storage battery pack is moderately consumed, discharged and charged one by one in a time-sharing manner by controlling the gating switch array, so as to accurately and reliably measure and evaluate an effective capacity (state of health (SOH)) of the storage battery pack.

The series batteries with high relative state of charge (SOC) under the charging state are connected to the dissipation resistor in a time-sharing manner for bypass shunting of the charging current by controlling the gating switch array, or the series batteries with low relative state of charge (SOC) are connected to the DC/DC converter for parallel increase of the charging current. The equalization of the relative state of charge of each series battery under the charging state is achieved, and the reduction of the storage power of the storage battery pack caused by insufficient charging of the whole storage battery pack due to untimely overcharge protection caused by an individual battery with small capacity or high state of charge is avoided.

The series batteries with low relative state of charge (SOC) under the discharging state are connected to the DC/DC converter in a time-sharing manner for parallel supplement assistance of the discharging current by controlling the gating switch array. The equalization of the discharge power of each series battery under the discharging state is achieved, and the reduction of the discharge power of the battery pack caused by insufficient power discharge of most series batteries due to untimely over-discharge protection caused by an individual series battery with small capacity or low state of charge is avoided. The effective capacity of the storage battery pack is increased, and the state of health of the storage battery pack is improved.

A specific circuit structure and a working mode are as follows:

For a battery pack having an even number of series batteries, as shown in FIG. 1, the series storage battery pack 1 is formed by connecting series batteries 101-1(2n) in series. The potentials of the series batteries are sequentially increased in the order of 101, 102, . . . , 1(2n−1), 1(2n). 101, . . . , 1(2n−1) are odd-numbered series batteries sequentially arranged from low potential to high potential. 102, . . . , 1(2n) are even-numbered series batteries sequentially arranged from low potential to high potential.

The gating switch array 2 is composed of normally-open electric control switches 201-2(2n). One ends of the electric control switches 201, . . . , 2(2n−1) are connected to positive poles of the odd-numbered series batteries 101, . . . , 1(2n−1) respectively, and the other ends are connected to an odd bus 299. One end of an electric control switch 200 is connected to a main negative pole of the storage battery pack, one ends of the electric control switches 202, . . . , 2(2n) are connected to positive poles of the even-numbered series batteries respectively, and the other ends are connected to an even bus 298.

For a battery pack having an odd number of series batteries, as shown in FIG. 2, the series storage battery pack 1 is formed by connecting series batteries 101-1(2n+1) in series. The potentials of the series batteries are sequentially increased in the order of 101, 102, . . . , 1(2n), 1(2n+1). 101, . . . , 1(2n+1) are odd-numbered series batteries sequentially arranged from low potential to high potential. 102, . . . , 1(2n) are even-numbered series batteries sequentially arranged from low potential to high potential.

The gating switch array 2 is composed of normally-open electric control switches 201-2(2n+1). One ends of the electric control switches 201, . . . , 2(2n+1) are connected to positive poles of the odd-numbered series batteries 101, . . . , 1(2n+1) respectively, and the other ends are connected to an odd bus 299. One end of the electric control switch 200 is connected to a main negative pole of the storage battery pack, one ends of the electric control switches 202, . . . , 2(2n) are connected to positive poles of the even-numbered series batteries respectively, and the other ends are connected to an even bus 298.

The odd bus 299 and the even bus 298 are connected to two ends of the power dissipation loop 3, two output ends of the polarity matching switch array 4 and input ends of the bipolar differential battery voltage measurement circuit 6. The power dissipation loop 3 is internally formed by connecting one dissipation resistance load 301 and one normally-open electric control switch 302 in series.

The two input ends of the bipolar differential battery voltage measurement circuit 6 are connected to the odd bus 299 and the even bus 298 respectively, an output end is connected to the micro controller unit, input signals with positive polarity and negative polarity may be differentially amplified, and an input common-mode voltage range is not smaller than the highest output voltage of the storage battery pack.

The polarity matching switch array 4 is composed of two double-pole polarity matching switch groups, namely a second polarity matching switch group 41 and a first polarity matching switch group 42. A normally-open switch contact 411 of the second polarity matching switch group 41 is bridged between a positive output end of the isolated DC/DC converter 5 and the odd bus 299, and another normally-open switch contact 412 is bridged between a negative output end of the isolated DC/DC converter 5 and the even bus 298. A normally-open switch contact 421 of the first polarity matching switch group 42 is bridged between the negative output end of the isolated DC/DC converter 5 and the odd bus 299, and another normally-open switch contact 422 is bridged between the positive output end of the isolated DC/DC converter 5 and the even bus 298.

The electric control switch may be one of devices such as an electromagnetic relay, a solid-state relay (SSR), a photoelectric coupling relay (PhotoMOS), and a magnetic reed relay (MRR), which may control the on-off of an electrical loop under the control of an electric signal. When the above electric control switch is adopted, the electric control switch may be matched into a working mode in which a single or a plurality of normally-open or normally-closed contacts are connected in parallel.

The positive input ends and the negative input ends of the isolated DC/DC converter 5 are connected to a main positive end and a main negative end of the storage battery pack 1 respectively, and the output end of the bipolar differential battery voltage measurement circuit 6 is connected to the single-chip microcomputer data acquisition and control unit 7.

The inputs and the outputs of the isolated DC/DC converter 5 are electrically isolated, an input voltage range is required to be larger than a variation range of a total output voltage of the storage battery pack, a no-load output voltage is equal to the maximum allowable operating voltage of the series batteries of the storage battery pack, a constant current output characteristic is presented, and the output current during the constant current operation is not greater than the maximum allowable charging current of the series batteries of the storage battery pack.

The charging/discharging current detection loop 8 and the high-power switch circuit 9 are connected in series to a main negative output connecting line of the storage battery pack.

The main working process of a storage battery pack capacity on-line detection and charging/discharging efficient equalization circuit includes the charging/discharging management and efficient equalization of a storage battery pack, the storage battery pack capacity on-line detection, and other functional states.

The charging/discharging management and efficient equalization working process of a storage battery pack specifically includes:

firstly, sequentially turning on gating switches 200 and 201, 201 and 202, . . . , 2(2n−1) and 2(2n), 2(2n) and 2(2n+1) in pairs, and connecting positive poles and the negative poles of series batteries such as series batteries 101, 102, . . . , 1(2n−1), 1(2n), 1(2n+1) in the storage battery pack to buses 299 and 298 in a time-sharing manner, where the positive poles and the negative poles of the odd-numbered series batteries are connected to the odd bus 299 and the even bus 298 respectively, and the positive poles and the negative poles of the even-numbered series batteries are connected to the even bus 298 and the odd bus 299 respectively;

converting a high common mode differential battery voltage signal into a ground single-end potential signal with a suitable dynamic range by the bipolar differential battery voltage measurement circuit 6, sending the ground single-end potential signal into the single-chip microcomputer data acquisition and control unit 7 for AD conversion, and acquiring voltage data of each series battery; and simultaneously acquiring the charging/discharging currents of the storage battery pack in real time through the charging/discharging current detection loop by the single-chip microcomputer data acquisition and control unit 7, and completing five charging/discharging management and efficient equalization functions of the storage battery pack by an internal CPU according to the acquired voltage and charging/discharging current data of all the series batteries:

(1) under a charging state, it is determined that the series batteries with a large voltage deviation from a central value in the storage battery pack are connected to the isolated DC/DC converter 5 through the gating switch array 2 for power supplement, or are connected to the power dissipation loop 3 for power discharge, so that the efficient power charging equalization of the series batteries of the storage battery pack is achieved;

(2) under a discharging state, it is determined that the series batteries with the lowest voltage in the storage battery pack are connected to the isolated DC/DC converter 5 through the gating switch array 2 for power supplement assistance, so that the discharging current of the battery is reduced, and the efficient discharging equalization of the storage battery pack is achieved;

(3) when the voltage of a certain series battery is charged to an upper limit value, a charging loop of the high-power switch circuit 9 is turned off to achieve overcharge protection;

(4) when the voltage of a certain series battery is discharged to a lower limit value, a discharging loop of the high-power switch circuit 9 is turned off to achieve over-discharge protection; and (5) when the charging current or the discharging current is greater than an allowable threshold, the charging loop or the discharging loop of the high-power switch circuit 9 is turned off to achieve the charging and discharging over-current protection of the storage battery pack.

An efficient equalization working process under the charging state of the storage battery pack specifically includes:

under the charging state, connecting a positive pole end and a negative pole end of a series battery with the maximum voltage deviation from a central value to the odd bus 299 and the even bus 298 by controlling the gating switch array 2, and if the battery is greater than the central value, turning on a dissipation loop electric control switch 302 of the power dissipation loop 3, and shunting current charged into the battery through a dissipation resistance load 301; and if the battery voltage is smaller than the central value, connecting odd-numbered series batteries to a second polarity matching switch group 41 (electric control switches 411 and 412) of the polarity matching switch array 4 and connecting even-numbered series batteries to a first polarity matching switch group 42 (electric control switches 421 and 422) of the polarity matching switch array 4, so that the gated series batteries are connected to the isolated DC/DC converter 5 for power supplement in a polarity corresponding manner.

An efficient equalization working process under the discharging state of the storage battery pack specifically includes:

under the discharging state, connecting a positive pole end and a negative pole end of a series battery with the minimum voltage value to the odd bus 299 and the even bus 298 by controlling the gating switch array 2, connecting the odd-numbered series batteries to the second polarity matching switch group 41 (electric control switches 411 and 412) of the polarity matching switch array 4, and connecting the even-numbered series batteries to the first polarity matching switch group 42 (electric control switches 421 and 422) of the polarity matching switch array 4, so that the gated series batteries are connected to the isolated DC/DC converter 5 for power supplement assistance in a polarity corresponding manner, and the power consumption of the battery is reduced.

A storage battery pack capacity on-line detection process specifically includes:

setting an interval time (typically few weeks or few months) of capacity monitoring according to system requirements, sequentially gating positive poles and negative poles of a series battery of the storage battery pack to the odd bus and the even bus in a time-sharing manner through the gating switch array 2 when the storage battery pack is connected with a charging power supply and is in a charging protection and non-discharging state, and meanwhile, turning on the electric control switch 302 of the power dissipation loop 3 to discharge the connected series battery through the resistance load 301;

meanwhile, sending the voltage of the series battery to the single-chip microcomputer data acquisition and control unit 7 through the bipolar differential battery voltage measurement circuit 6 for real-time acquisition, calculating discharging current at each moment according to the acquired voltage of the series battery and a resistance value of a load resistor, calculating an accumulated power ($ROC_D$) actually discharged through time integration until the voltage of the battery drops to a certain ratio (typically 70% or below) according to a relative state of charge (SOC) corresponding to an open circuit voltage (OCV), turning off the electric control switch 302 of the power dissipation loop 3 to stop discharging, subtracting an initial relative state of charge ($SOC_0$) at the beginning of discharging from a relative state of charge ($SOC_1$) at the end of discharging to calculate a discharged relative state of charge ($SOC_D$), and then calculating an $ROC_D/SOC_D$ value to be an actual capacity value of the series battery;

then correspondingly connecting the series batteries to the second polarity matching switch group 41 or the first polarity matching switch group 42 according to odd numbers and even numbers of the series batteries, so that the series batteries are connected to the isolated DC/DC converter 5 in a polarity corresponding manner and are independently supplemented with power till a full-power state; and sequentially performing power discharge test on the capacity of each series battery of the storage battery pack according to this step and performing independent charging to restore a full-power state to keep the electric energy reserves of the battery pack, the minimum capacity of all the series batteries measured is the effective capacity of the storage battery pack.

An emergency power supply process during storage battery pack capacity on-line detection specifically includes:

if the relative capacity (SOC) of a battery pack being discharged and measured is low when the battery pack needs to supply power in a power discharge measurement process of the storage battery pack, correspondingly connecting the series batteries being discharged and measured to the second polarity matching switch group 41 or the first polarity matching switch group 42 according to odd numbers and even numbers of the series batteries at this moment, so that the series batteries are connected to the isolated DC/DC converter 5 in a polarity corresponding manner for power supplement assistance, thereby reducing the power consumption of the battery, prolonging the time for the battery to reach the discharge protection state, fully utilizing power stored by other batteries which are not discharged, slightly reducing the power which can be supplied by the whole battery pack, and ensuring the emergency working capability of the storage battery pack.

Embodiment 2

Embodiment 2 of the present disclosure provides a series battery pack capacity on-line monitoring and charging/discharging dual-state equalization system, which includes at least one storage battery pack or a plurality of storage battery packs connected in series or in parallel. Each storage battery pack uses the series battery pack capacity on-line monitoring and charging/discharging dual-state equalization circuit according to Embodiment 1 of the present disclosure for on-line measurement and evaluation of an effective capacity of the storage battery pack and efficient equalized management of a state of charge of each series battery of the storage battery pack under two working states of charging and discharging.

The foregoing descriptions are merely exemplary embodiments of the present disclosure, but are not intended to limit the present disclosure. The present disclosure may include various modifications and changes for a person skilled in the art. Any modification, equivalent replacement, or improvement made within the spirit and principle of the present disclosure shall fall within the protection scope of the present disclosure.

What is claimed is:

1. A series battery pack capacity on-line monitoring and charging/discharging dual-state equalization circuit, comprising: a storage battery pack, a gating switch array, a power dissipation loop, a polarity matching switch array, an isolated DC/DC converter, a bipolar differential battery voltage measurement circuit, a micro controller unit, a charging/discharging current detection loop, and a switch circuit unit, wherein
    the storage battery pack comprises a plurality of series batteries, the gating switch array connects positive poles of the odd-numbered series batteries of the storage battery pack to an odd bus through an electric control switch, and connects positive poles of the even-numbered series batteries and a main negative pole of the storage battery pack to an even bus through the electric control switch, and the odd bus and the even bus are connected to two ends of the power dissipation loop, two output ends of the polarity matching switch array and two input ends of the bipolar differential battery voltage measurement circuit respectively; and
    the polarity matching switch array disconnects the odd bus and the even bus from outputs of the isolated DC/DC converter or converts the odd bus and the even bus to be with the same voltage polarity as the outputs of the isolated DC/DC converter and then connects the odd bus, the even bus and the outputs of the isolated DC/DC converter together, the bipolar differential battery voltage measurement circuit converts bipolar high common mode battery voltage differential signal conditioning on the odd bus and the even bus into a unipolar voltage suitable for input requirements of the micro controller unit and referring to a signal ground and sends the unipolar voltage into the micro controller unit, and the charging/discharging current detection loop and a switch circuit are connected in series to a main negative pole output connecting line of the storage battery pack.

2. The series battery pack capacity on-line monitoring and charging/discharging dual-state equalization circuit according to claim 1, wherein the polarity matching switch array comprises two groups of double-pole linkage electric control switches cross-connected in parallel, a normally-open switch of the first group of electric control switches is bridged between the odd bus and a positive pole of the isolated DC/DC converter, and another normally-open switch is bridged between the even bus and a negative pole of the isolated DC/DC converter; and
    a normally-open switch of the second group of electric control switches is bridged between the even bus and the positive pole of the isolated DC/DC converter, another normally-open switch is bridged between the odd bus and the negative pole of the isolated DC/DC converter, and the outputs of the isolated DC/DC converter are connected with the series batteries of the storage battery pack gated by the gating switch array with the same polarity by controlling the two electric control switches to be turned on in a time-sharing manner.

3. The series battery pack capacity on-line monitoring and charging/discharging dual-state equalization circuit according to claim 2, wherein the polarity matching switch array is a circuit unit with four ports formed by a plurality of groups of electric control switches, two of the ports are connected with the odd bus and the even bus, the other two ports are connected with positive output ends and negative output ends of the isolated DC/DC converter, and the on-off of an internal switch is controlled by the micro controller unit.

4. The series battery pack capacity on-line monitoring and charging/discharging dual-state equalization circuit according to claim 1, wherein the gating switch array is composed of a number of series batteries and an electric control switch, the storage battery pack is formed by connecting a plurality of storage batteries in series, a main positive pole and a main negative pole of the storage battery pack and each battery series connection point are connected to one end of an electric control switch normally-open switch contact of the gating switch array, the other end of the electric control switch normally-open switch contact connected with the positive poles of the odd-numbered series batteries is connected to the odd bus, and the other end of the electric control switch normally-open switch contact connected with the positive poles of the even-numbered series batteries and the main negative pole of the storage battery pack is connected to the even bus.

5. The series battery pack capacity on-line monitoring and charging/discharging dual-state equalization circuit according to claim 1, wherein the power dissipation loop is formed by connecting a normally-open switch contact of an electric control switch and a resistor or an equivalent electric energy dissipation circuit network in series; or,
    input ends of the isolated DC/DC converter are connected to the main positive pole and the main negative pole of the storage battery pack, and output ends are connected to an input end of the polarity matching switch array respectively; or,
    two input ends of the bipolar differential battery voltage measurement circuit are connected to the odd bus and the even bus respectively, and an output end is connected to the micro controller unit.

6. The series battery pack capacity on-line monitoring and charging/discharging dual-state equalization circuit according to claim 1, wherein the micro controller unit performs AD conversion acquisition on signals output from the bipolar differential battery voltage measurement circuit, and controls the on-off of corresponding electric control switches in the gating switch array, the polarity matching switch array and the power dissipation loop according to a working state of the storage battery pack determined by parameters such as voltage and charging/discharging current of all the series batteries of the storage battery pack obtained through time-sharing measurement, so as to achieve on-line measurement and evaluation of an effective capacity of the storage battery pack and efficient equalized management of a state of charge of each series battery of the storage battery under two working states of charging and discharging.

7. A series battery pack capacity on-line monitoring and charging/discharging dual-state equalization system, comprising: at least one storage battery pack, wherein the storage battery pack uses the series battery pack capacity on-line monitoring and charging/discharging dual-state equalization circuit according to claim 1 for measurement and evaluation of an effective capacity of the storage battery pack and efficient equalized management of a state of charge of each series battery of the storage battery pack under two working states of charging and discharging.

8. A series battery pack capacity on-line monitoring and charging/discharging dual-state equalization method, wherein the series battery pack capacity on-line monitoring and charging/discharging dual-state equalization circuit according to claim 1 is used;
   an efficient equalization working process under a charging state of a storage battery pack specifically comprises:
   under the charging state, connecting a positive pole end and a negative pole end of a series battery with the maximum voltage deviation from a central value to an odd bus and an even bus through a gating switch array;
   if the battery is greater than the central value, turning on a dissipation loop electric control switch of a power dissipation loop, and dissipating energy of the battery through a dissipation resistance load or shunting current charged into the battery; and
   if the battery voltage is smaller than the central value, connecting odd-numbered series batteries to a second polarity matching switch group of a polarity matching switch array, and connecting even-numbered series batteries to a first polarity matching switch group of the polarity matching switch array, so that the gated series batteries are connected to an isolated DC/DC converter for power supplement in a polarity corresponding manner to achieve equalization working under the charging state;
   an efficient equalization working process under a discharging state of the storage battery pack specifically comprises:
   under the discharging state, connecting a positive pole end and a negative pole end of a series battery with the minimum voltage value to the odd bus and the even bus through the gating switch array, connecting the odd-numbered series batteries to the second polarity matching switch group of the polarity matching switch array, and connecting the even-numbered series batteries to the first polarity matching switch group of the polarity matching switch array, so that the gated series batteries are connected to the isolated DC/DC converter for power supplement assistance in a polarity corresponding manner, and the power consumption of the battery is reduced to achieve equalization working under the discharging state.

9. The series battery pack capacity on-line monitoring and charging/discharging dual-state equalization method according to claim 8, wherein a storage battery pack capacity on-line detection process specifically comprises:
   setting an interval time of capacity monitoring according to system requirements, sequentially connecting a positive pole end and a negative pole end of a series battery of the storage battery pack to the odd bus and the even bus in a time-sharing manner through the gating switch array when the storage battery pack is connected with a charging power supply and is in a charging protection and non-discharging state, and turning on an electric control switch of the power dissipation loop to discharge the gated series battery through a resistor or an equivalent electric energy dissipation circuit network;
   meanwhile, sending the voltage of the series battery to a micro controller unit through a bipolar differential battery voltage measurement circuit for real-time acquisition, calculating discharging current at each moment according to the acquired voltage of the series battery, load resistance or a resistance value of the equivalent electric energy dissipation circuit network, calculating an actual accumulated power $ROC_D$ discharged through time integration until the voltage of the battery drops to a set ratio according to a relative state of charge SOC corresponding to an open circuit voltage, turning off the electric control switch of the power dissipation loop to stop discharging, subtracting an initial relative state of charge $SOC_0$ corresponding to the open circuit voltage at the beginning of discharging from a relative state of charge $SOC_1$ corresponding to the open circuit voltage at the end of discharging to calculate a discharged relative state of charge $SOC_D$, and then calculating an $ROC_D/SOC_D$ value to be an actual capacity value of the series battery;
   correspondingly connecting the series batteries to a group of switches of a polarity matching switch according to odd numbers and even numbers of the series batteries, so that the series batteries are connected to the isolated DC/DC converter in a polarity corresponding manner and are independently supplemented with power till a full-power state; and
   sequentially performing power discharge test on the capacity of each series battery of the storage battery pack according to this step and performing independent charging to restore the full-power state to always keep the battery pack to have high electric energy reserves, and the minimum capacity of all the series batteries thus measured is the effective capacity of the storage battery pack.

10. The series battery pack capacity on-line monitoring and charging/discharging dual-state equalization method according to claim 9, wherein an emergency power supply process during storage battery pack capacity on-line detection specifically comprises:
   if the relative capacity of a battery pack being discharged and measured is low when the battery pack needs to supply power in a power discharge measurement process during on-line detection of the storage battery pack, correspondingly connecting the series batteries being discharged and measured to the polarity matching switch according to odd numbers and even numbers of the series batteries, so that the series batteries are connected to the isolated DC/DC converter in a polarity corresponding manner for power supplement assistance.

11. A series battery pack capacity on-line monitoring and charging/discharging dual-state equalization method, wherein the series battery pack capacity on-line monitoring and charging/discharging dual-state equalization circuit according to claim 2 is used;
   an efficient equalization working process under a charging state of a storage battery pack specifically comprises:
   under the charging state, connecting a positive pole end and a negative pole end of a series battery with the maximum voltage deviation from a central value to an odd bus and an even bus through a gating switch array; if the battery is greater than the central value, turning on a dissipation loop electric control switch of a power dissipation loop, and dissipating energy of the battery through a dissipation resistance load or shunting current charged into the battery; and if the battery voltage is smaller than the central value, connecting odd-numbered series batteries to a second polarity matching switch group of a polarity matching switch array, and connecting even-numbered series batteries to a first polarity matching switch group of the polarity matching switch array, so that the gated series batteries are connected to an isolated DC/DC converter for power supplement in a polarity corresponding manner to achieve equalization working under the charging state;

an efficient equalization working process under a discharging state of the storage battery pack specifically comprises:

under the discharging state, connecting a positive pole end and a negative pole end of a series battery with the minimum voltage value to the odd bus and the even bus through the gating switch array, connecting the odd-numbered series batteries to the second polarity matching switch group of the polarity matching switch array, and connecting the even-numbered series batteries to the first polarity matching switch group of the polarity matching switch array, so that the gated series batteries are connected to the isolated DC/DC converter for power supplement assistance in a polarity corresponding manner, and the power consumption of the battery is reduced to achieve equalization working under the discharging state.

12. The series battery pack capacity on-line monitoring and charging/discharging dual-state equalization method according to claim 11, wherein a storage battery pack capacity on-line detection process specifically comprises:

setting an interval time of capacity monitoring according to system requirements, sequentially connecting a positive pole end and a negative pole end of a series battery of the storage battery pack to the odd bus and the even bus in a time-sharing manner through the gating switch array when the storage battery pack is connected with a charging power supply and is in a charging protection and non-discharging state, and turning on an electric control switch of the power dissipation loop to discharge the gated series battery through a resistor or an equivalent electric energy dissipation circuit network; meanwhile, sending the voltage of the series battery to a micro controller unit through a bipolar differential battery voltage measurement circuit for real-time acquisition, calculating discharging current at each moment according to the acquired voltage of the series battery, load resistance or a resistance value of the equivalent electric energy dissipation circuit network, calculating an actual accumulated power $ROC_D$ discharged through time integration until the voltage of the battery drops to a set ratio according to a relative state of charge SOC corresponding to an open circuit voltage, turning off the electric control switch of the power dissipation loop to stop discharging, subtracting an initial relative state of charge $SOC_0$ corresponding to the open circuit voltage at the beginning of discharging from a relative state of charge $SOC_1$ corresponding to the open circuit voltage at the end of discharging to calculate a discharged relative state of charge $SOC_D$; and then calculating an $ROC_D/SOC_D$ value to be an actual capacity value of the series battery;

correspondingly connecting the series batteries to a group of switches of a polarity matching switch according to odd numbers and even numbers of the series batteries, so that the series batteries are connected to the isolated DC/DC converter in a polarity corresponding manner and are independently supplemented with power till a full-power state; and sequentially performing power discharge test on the capacity of each series battery of the storage battery pack according to this step and performing independent charging to restore the full-power state to always keep the battery pack to have high electric energy reserves, and the minimum capacity of all the series batteries thus measured is the effective capacity of the storage battery pack.

13. A series battery pack capacity on-line monitoring and charging/discharging dual-state equalization method, wherein the series battery pack capacity on-line monitoring and charging/discharging dual-state equalization circuit according to claim 3 is used;

an efficient equalization working process under a charging state of a storage battery pack specifically comprises:

under the charging state, connecting a positive pole end and a negative pole end of a series battery with the maximum voltage deviation from a central value to an odd bus and an even bus through a gating switch array; if the battery is greater than the central value, turning on a dissipation loop electric control switch of a power dissipation loop, and dissipating energy of the battery through a dissipation resistance load or shunting current charged into the battery; and if the battery voltage is smaller than the central value, connecting odd-numbered series batteries to a second polarity matching switch group of a polarity matching switch array, and connecting even-numbered series batteries to a first polarity matching switch group of the polarity matching switch array, so that the gated series batteries are connected to an isolated DC/DC converter for power supplement in a polarity corresponding manner to achieve equalization working under the charging state;

an efficient equalization working process under a discharging state of the storage battery pack specifically comprises:

under the discharging state, connecting a positive pole end and a negative pole end of a series battery with the minimum voltage value to the odd bus and the even bus through the gating switch array, connecting the odd-numbered series batteries to the second polarity matching switch group of the polarity matching switch array, and connecting the even-numbered series batteries to the first polarity matching switch group of the polarity matching switch array, so that the gated series batteries are connected to the isolated DC/DC converter for power supplement assistance in a polarity corresponding manner, and the power consumption of the battery is reduced to achieve equalization working under the discharging state.

14. The series battery pack capacity on-line monitoring and charging/discharging dual-state equalization method according to claim 13, wherein a storage battery pack capacity on-line detection process specifically comprises:

setting an interval time of capacity monitoring according to system requirements, sequentially connecting a positive pole end and a negative pole end of a series battery of the storage battery pack to the odd bus and the even bus in a time-sharing manner through the gating switch array when the storage battery pack is connected with a charging power supply and is in a charging protection and non-discharging state, and turning on an electric control switch of the power dissipation loop to discharge the gated series battery through a resistor or an equivalent electric energy dissipation circuit network;

meanwhile, sending the voltage of the series battery to a micro controller unit through a bipolar differential battery voltage measurement circuit for real-time acquisition, calculating discharging current at each moment according to the acquired voltage of the series battery, load resistance or a resistance value of the equivalent electric energy dissipation circuit network, calculating an actual accumulated power $ROC_D$ discharged through time integration until the voltage of the battery drops to a set ratio according to a relative state of charge SOC corresponding to an open circuit voltage, turning off the electric control switch of the power dissipation loop to stop discharging, subtracting an initial relative state of charge $SOC_0$ corresponding to the open circuit voltage at the beginning of discharging from a relative state of charge $SOC_1$ corresponding to the open circuit voltage at the end of discharging to calculate a discharged relative state of charge $SOC_D$, and then calculating an $ROC_D/SOC_D$ value to be an actual capacity value of the series battery;

correspondingly connecting the series batteries to a group of switches of a polarity matching switch according to odd numbers and even numbers of the series batteries, so that the series batteries are connected to the isolated DC/DC converter in a polarity corresponding manner and are independently supplemented with power till a full-power state; and sequentially performing power discharge test on the capacity of each series battery of the storage battery pack according to this step and performing independent charging to restore the full-power state to always keep the battery pack to have high electric energy reserves, and the minimum capacity of all the series batteries thus measured is the effective capacity of the storage battery pack.

15. A series battery pack capacity on-line monitoring and charging/discharging dual-state equalization method, wherein the series battery pack capacity on-line monitoring and charging/discharging dual-state equalization circuit according to claim 4 is used;

an efficient equalization working process under a charging state of a storage battery pack specifically comprises:

under the charging state, connecting a positive pole end and a negative pole end of a series battery with the maximum voltage deviation from a central value to an odd bus and an even bus through a gating switch array;

if the battery is greater than the central value, turning on a dissipation loop electric control switch of a power dissipation loop, and dissipating energy of the battery through a dissipation resistance load or shunting current charged into the battery; and if the battery voltage is smaller than the central value, connecting odd-numbered series batteries to a second polarity matching switch group of a polarity matching switch array, and connecting even-numbered series batteries to a first polarity matching switch group of the polarity matching switch array, so that the gated series batteries are connected to an isolated DC/DC converter for power supplement in a polarity corresponding manner to achieve equalization working under the charging state;

an efficient equalization working process under a discharging state of the storage battery pack specifically comprises:

under the discharging state, connecting a positive pole end and a negative pole end of a series battery with the minimum voltage value to the odd bus and the even bus through the gating switch array, connecting the odd-numbered series batteries to the second polarity matching switch group of the polarity matching switch array, and connecting the even-numbered series batteries to the first polarity matching switch group of the polarity matching switch array, so that the gated series batteries are connected to the isolated DC/DC converter for power supplement assistance in a polarity corresponding manner, and the power consumption of the battery is reduced to achieve equalization working under the discharging state.

16. The series battery pack capacity on-line monitoring and charging/discharging dual-state equalization method according to claim 15, wherein a storage battery pack capacity on-line detection process specifically comprises:

setting an interval time of capacity monitoring according to system requirements, sequentially connecting a positive pole end and a negative pole end of a series battery of the storage battery pack to the odd bus and the even bus in a time-sharing manner through the gating switch array when the storage battery pack is connected with a charging power supply and is in a charging protection and non-discharging state, and turning on an electric control switch of the power dissipation loop to discharge the gated series battery through a resistor or an equivalent electric energy dissipation circuit network;

meanwhile, sending the voltage of the series battery to a micro controller unit through a bipolar differential battery voltage measurement circuit for real-time acquisition, calculating discharging current at each moment according to the acquired voltage of the series battery, load resistance or a resistance value of the equivalent electric energy dissipation circuit network, calculating an actual accumulated power $ROC_D$ discharged through time integration until the voltage of the battery drops to a set ratio according to a relative state of charge SOC corresponding to an open circuit voltage, turning off the electric control switch of the power dissipation loop to stop discharging, subtracting an initial relative state of charge $SOC_0$ corresponding to the open circuit voltage at the beginning of discharging from a relative state of charge $SOC_1$ corresponding to the open circuit voltage at the end of discharging to calculate a discharged relative state of charge $SOC_D$, and then calculating an $ROC_D/SOC_D$ value to be an actual capacity value of the series battery;

correspondingly connecting the series batteries to a group of switches of a polarity matching switch according to odd numbers and even numbers of the series batteries, so that the series batteries are connected to the isolated DC/DC converter in a polarity corresponding manner and are independently supplemented with power till a full-power state; and sequentially performing power discharge test on the capacity of each series battery of the storage battery pack according to this step and performing independent charging to restore the full-power state to always keep the battery pack to have high electric energy reserves, and the minimum capacity of all the series batteries thus measured is the effective capacity of the storage battery pack.

17. A series battery pack capacity on-line monitoring and charging/discharging dual-state equalization method, wherein the series battery pack capacity on-line monitoring and charging/discharging dual-state equalization circuit according to claim 5 is used;

an efficient equalization working process under a charging state of a storage battery pack specifically comprises:

under the charging state, connecting a positive pole end and a negative pole end of a series battery with the maximum voltage deviation from a central value to an odd bus and an even bus through a gating switch array;

if the battery is greater than the central value, turning on a dissipation loop electric control switch of a power dissipation loop, and dissipating energy of the battery through a dissipation resistance load or shunting current charged into the battery; and if the battery voltage is smaller than the central value, connecting odd-numbered series batteries to a second polarity matching switch group of a polarity matching switch array, and connecting even-numbered series batteries to a first polarity matching switch group of the polarity matching switch array, so that the gated series batteries are connected to an isolated DC/DC converter for power supplement in a polarity corresponding manner to achieve equalization working under the charging state;

an efficient equalization working process under a discharging state of the storage battery pack specifically comprises:

under the discharging state, connecting a positive pole end and a negative pole end of a series battery with the minimum voltage value to the odd bus and the even bus through the gating switch array, connecting the odd-numbered series batteries to the second polarity matching switch group of the polarity matching switch array, and connecting the even-numbered series batteries to the first polarity matching switch group of the polarity matching switch array, so that the gated series batteries are connected to the isolated DC/DC converter for power supplement assistance in a polarity corresponding manner, and the power consumption of the battery is reduced to achieve equalization working under the discharging state.

18. The series battery pack capacity on-line monitoring and charging/discharging dual-state equalization method according to claim 17, wherein a storage battery pack capacity on-line detection process specifically comprises:

setting an interval time of capacity monitoring according to system requirements, sequentially connecting a positive pole end and a negative pole end of a series battery of the storage battery pack to the odd bus and the even bus in a time-sharing manner through the gating switch array when the storage battery pack is connected with a charging power supply and is in a charging protection and non-discharging state, and turning on an electric control switch of the power dissipation loop to discharge the gated series battery through a resistor or an equivalent electric energy dissipation circuit network;

meanwhile, sending the voltage of the series battery to a micro controller unit through a bipolar differential battery voltage measurement circuit for real-time acquisition, calculating discharging current at each moment according to the acquired voltage of the series battery, load resistance or a resistance value of the equivalent electric energy dissipation circuit network, calculating an actual accumulated power $ROC_D$ discharged through time integration until the voltage of the battery drops to a set ratio according to a relative state of charge SOC corresponding to an open circuit voltage, turning off the electric control switch of the power dissipation loop to stop discharging, subtracting an initial relative state of charge $SOC_0$ corresponding to the open circuit voltage at the beginning of discharging from a relative state of charge $SOC_1$ corresponding to the open circuit voltage at the end of discharging to calculate a discharged relative state of charge $SOC_D$, and then calculating an $ROC_D/SOC_D$ value to be an actual capacity value of the series battery;

correspondingly connecting the series batteries to a group of switches of a polarity matching switch according to odd numbers and even numbers of the series batteries, so that the series batteries are connected to the isolated DC/DC converter in a polarity corresponding manner and are independently supplemented with power till a full-power state; and sequentially performing power discharge test on the capacity of each series battery of the storage battery pack according to this step and performing independent charging to restore the full-power state to always keep the battery pack to have high electric energy reserves, and the minimum capacity of all the series batteries thus measured is the effective capacity of the storage battery pack.

19. A series battery pack capacity on-line monitoring and charging/discharging dual-state equalization method, wherein the series battery pack capacity on-line monitoring and charging/discharging dual-state equalization circuit according to claim 6 is used;

an efficient equalization working process under a charging state of a storage battery pack specifically comprises:

under the charging state, connecting a positive pole end and a negative pole end of a series battery with the maximum voltage deviation from a central value to an odd bus and an even bus through a gating switch array;

if the battery is greater than the central value, turning on a dissipation loop electric control switch of a power dissipation loop, and dissipating energy of the battery through a dissipation resistance load or shunting current charged into the battery; and if the battery voltage is smaller than the central value, connecting odd-numbered series batteries to a second polarity matching switch group of a polarity matching switch array, and connecting even-numbered series batteries to a first polarity matching switch group of the polarity matching switch array, so that the gated series batteries are connected to an isolated DC/DC converter for power supplement in a polarity corresponding manner to achieve equalization working under the charging state;

an efficient equalization working process under a discharging state of the storage battery pack specifically comprises:

under the discharging state, connecting a positive pole end and a negative pole end of a series battery with the minimum voltage value to the odd bus and the even bus through the gating switch array, connecting the odd-numbered series batteries to the second polarity matching switch group of the polarity matching switch array, and connecting the even-numbered series batteries to the first polarity matching switch group of the polarity matching switch array, so that the gated series batteries are connected to the isolated DC/DC converter for power supplement assistance in a polarity corresponding manner, and the power consumption of the battery is reduced to achieve equalization working under the discharging state.

20. The series battery pack capacity on-line monitoring and charging/discharging dual-state equalization method according to claim 19, wherein a storage battery pack capacity on-line detection process specifically comprises:

setting an interval time of capacity monitoring according to system requirements, sequentially connecting a positive pole end and a negative pole end of a series battery of the storage battery pack to the odd bus and the even bus in a time-sharing manner through the gating switch array when the storage battery pack is connected with a charging power supply and is in a charging protection and non-discharging state, and turning on an electric control switch of the power dissipation loop to discharge the gated series battery through a resistor or an equivalent electric energy dissipation circuit network;

meanwhile, sending the voltage of the series battery to a micro controller unit through a bipolar differential battery voltage measurement circuit for real-time acquisition, calculating discharging current at each moment according to the acquired voltage of the series battery, load resistance or a resistance value of the equivalent electric energy dissipation circuit network, calculating an actual accumulated power $ROC_D$ discharged through time integration until the voltage of the battery drops to a set ratio according to a relative state of charge SOC corresponding to an open circuit voltage, turning off the electric control switch of the power dissipation loop to stop discharging, subtracting an initial relative state of charge $SOC_0$ corresponding to the open circuit voltage at the beginning of discharging from a relative state of charge $SOC_1$ corresponding to the open circuit voltage at the end of discharging to calculate a discharged relative state of charge $SOC_D$, and then calculating an $ROC_D/SOC_D$ value to be an actual capacity value of the series battery;

correspondingly connecting the series batteries to a group of switches of a polarity matching switch according to odd numbers and even numbers of the series batteries, so that the series batteries are connected to the isolated DC/DC converter in a polarity corresponding manner and are independently supplemented with power till a full-power state; and sequentially performing power discharge test on the capacity of each series battery of the storage battery pack according to this step and performing independent charging to restore the full-power state to always keep the battery pack to have high electric energy reserves, and the minimum capacity of all the series batteries thus measured is the effective capacity of the storage battery pack.

* * * * *